(12) United States Patent
Peng et al.

(10) Patent No.: US 8,700,897 B2
(45) Date of Patent: Apr. 15, 2014

(54) METHOD AND TERMINAL EQUIPMENT FOR APPLYING DIGITAL RIGHTS MANAGEMENT

(75) Inventors: Yebin Peng, Shenzhen (CN); Longan Xiao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 3 days.

(21) Appl. No.: 13/574,764

(22) PCT Filed: Nov. 24, 2010

(86) PCT No.: PCT/CN2010/079090
§ 371 (c)(1),
(2), (4) Date: Jul. 23, 2012

(87) PCT Pub. No.: WO2012/009917
PCT Pub. Date: Jan. 26, 2012

(65) Prior Publication Data
US 2012/0303953 A1   Nov. 29, 2012

(30) Foreign Application Priority Data

Jul. 20, 2010   (CN) ........................ 2010 1 0233531

(51) Int. Cl.
*H04L 9/00* (2006.01)
*G06F 21/62* (2013.01)
*H04L 29/06* (2006.01)
*G06F 21/10* (2013.01)

(52) U.S. Cl.
CPC ....... *G06F 21/6209* (2013.01); *H04L 2209/603* (2013.01); *G06F 21/10* (2013.01); *H04L 63/0428* (2013.01)
USPC ........................................ 713/165

(58) Field of Classification Search
CPC ............................ G06F 21/10; H04L 63/0428
USPC .......................................................... 713/165
See application file for complete search history.

(56) References Cited

U.S. PATENT DOCUMENTS 7,325,198 B2 *   1/2008   Adcock et al. ................ 715/722
7,343,013 B2 *   3/2008   Pedlow, Jr. .................... 380/239
(Continued)

FOREIGN PATENT DOCUMENTS

CN            1392700 A      1/2003
CN            1774755 A      5/2006
(Continued)

OTHER PUBLICATIONS

International Search Report on international application No. PCT/CN2010/079090, mailed on May 5, 2011.
English Translation of the Written Opinion of the International Search Authority in international application No. PCT/CN2010/079090, mailed on May 5, 2011.

*Primary Examiner* — Kambiz Zand
*Assistant Examiner* — Aubrey Wyszynski
(74) *Attorney, Agent, or Firm* — Oppedahl Patent Law Firm LLC

(57) ABSTRACT

A method and terminal equipment for applying digital rights management are disclosed by the present disclosure. The method includes the following steps: performing encryption processing on a portion of the content of a multimedia file using a pre-generated key when downloading the multimedia file; and downloading the encrypted multimedia file to a designated terminal equipment. With the present disclosure, the downloading speed of the multimedia file can be increased, and the waiting time for playing the file can be decreased.

8 Claims, 4 Drawing Sheets

(56) References Cited

U.S. PATENT DOCUMENTS

| | | |
|---|---|---|
| 7,392,399 B2 * | 6/2008 | Grohoski et al. .............. 713/189 |
| 2003/0016829 A1 * | 1/2003 | Chu .............................. 380/281 |
| 2005/0129233 A1 * | 6/2005 | Pedlow, Jr. ................... 380/239 |
| 2007/0106906 A1 * | 5/2007 | Koike et al. ................... 713/189 |
| 2008/0163378 A1 | 7/2008 | Lee |

FOREIGN PATENT DOCUMENTS

| | | |
|---|---|---|
| CN | 1977534 A | 6/2007 |
| CN | 101019428 A | 8/2007 |
| CN | 101047843 A | 10/2007 |
| CN | 201044453 Y | 4/2008 |
| WO | 2005060415 A2 | 7/2005 |

* cited by examiner

METHOD AND TERMINAL EQUIPMENT FOR APPLYING DIGITAL RIGHTS MANAGEMENT

TECHNICAL FIELD

The present disclosure relates to the field of communications, particularly to a method and terminal equipment for applying Digital Rights Management (DRM).

BACKGROUND

With the development of digital multimedia technology, content providers provides increasingly rich multimedia contents, such as digital music, video and movies. Moreover, the requirement of content providers on security protection of digital multimedia content is getting higher. DRM security technology is a very popular and important digital content security protection means in the recent years, and its application in music, movies and other digital multimedia fields is being widened.

During application of the DRM, sometimes it is required to encrypt and save the content of a multimedia file, and decrypt the content of the multimedia file before a user uses it. However, with the enrichment and increasing of the music, movie and other digital media content to be downloaded, the encryption and decryption processing on the whole content of a file during downloading and consumption will lower processing efficiency and affect user experience, therefore it is necessary to provide an improved technical solution to solve this problem.

SUMMARY

In view of the problem that the encryption on a whole multimedia file during DRM application results in a lower processing efficiency in the prior art, the present disclosure aims to provide a method and terminal equipment for applying Digital Rights Management (DRM).

The method for applying digital rights management includes the following steps:

performing encryption processing on a portion of content of a multimedia file using a pre-generated key when downloading the multimedia file; and downloading the encrypted multimedia file to a designated terminal equipment.

Wherein pre-generating a key may include:

determining whether or not the multimedia file has rights;
generating a key according to rights of the multimedia file when the multimedia file has rights; and generating a key according to identification information of the terminal equipment when the multimedia file has no rights.

Wherein performing encryption processing on a portion of content of the multimedia file using the key may include:

determining whether or not the multimedia file has a header;

performing encryption processing on a header of the multimedia file using the key when the multimedia file has a header; and performing encryption processing on a predetermined length of content of the multimedia file using the key when the multimedia file has no header.

Preferably, the predetermined length of the content of the multimedia file may include:

a predetermined length of content from a beginning of the multimedia file.

During the playing of a multimedia file, the method may further include: decrypting, by the terminal equipment, the multimedia file using the key and playing the decrypted multimedia file.

The terminal equipment provided by the present disclosure includes: an encryption module configured to use a pre-generated key to perform encryption processing on a portion of content of a multimedia file to be downloaded; and a download module configured to download the multimedia file encrypted by the encryption module to a designated terminal equipment.

Wherein the terminal equipment may include: a key generation module configured to generate the key according to rights of the multimedia file or identification information of the terminal equipment.

Wherein the terminal equipment may include: a decryption module configured to use the key to decrypt the multimedia file downloaded by the download module; and a play module configured to play the multimedia file decrypted by the decryption module.

Further, the encryption module may include: a determining module configured to determine whether or not the multimedia file has a header;

a first encryption module configured to encrypt a header of the multimedia file using the key when the multimedia file is determined to have a header; and a second encryption module configured to encrypt a predetermined length of content of the multimedia file using the key when the multimedia file is determined to have no header.

Preferably, the second encryption module may be configured to encrypt a predetermined length of the content from a beginning of the multimedia file using the key.

Compared with the prior art, in the technical solution of the present disclosure, a portion of the content of a multimedia file is encrypted when the multimedia file is downloaded. In this way, in the circumstance where the security of the content is guaranteed, the downloading speed of the multimedia file is increased, and the waiting time for playing the file is decreased.

DETAILED DESCRIPTION

The present disclosure will be described in detail by referring to the accompanying drawings and specific embodiments, to make the objects, technical solutions and advantages of the present disclosure more evident.

According to an embodiment of the present disclosure, a method for applying Digital Rights Management (DRM) is provided.

The multimedia files described herein are multimedia files of file types specified in the DRM protocol.

Figure 1:
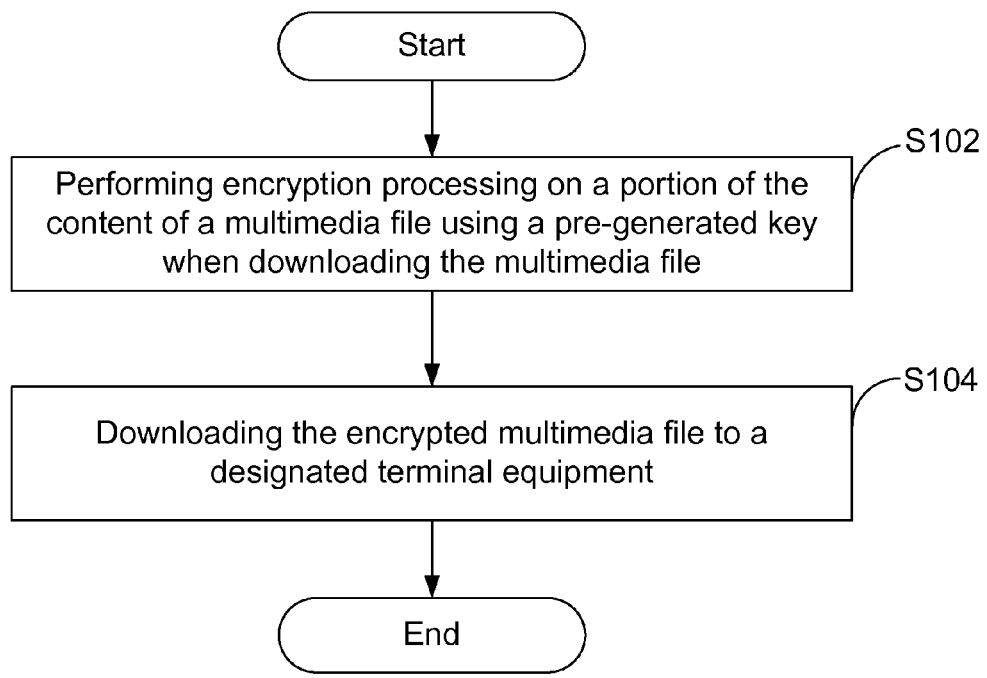
FIG. 1 is a flowchart illustrating a method for applying digital rights management according to an embodiment of the present disclosure.

FIG. 1 is a flowchart illustrating a method for applying digital rights management according to an embodiment of the present disclosure. As shown in FIG. 1, the method includes the following steps (S102-S104).

Step S102: performing encryption processing on a portion of the content of a multimedia file using a pre-generated key when downloading the multimedia file.

First of all, an encryption key needs to be generated. The key may be generated according to rights (RO) of the multimedia file. If the multimedia file has no rights, a key may be generated according to the identification information of the terminal equipment, for example, a key is generated according to the International Mobile Equipment Identity (IMEI) number of the terminal equipment. Further, the identification information of the terminal equipment for generating the key is not limited to the IMEI, and other information of the terminal equipment may also be used to generate a key, which is not described here.

It should be noted that the foregoing encryption algorithm is a universal encryption algorithm and will not be elaborated here.

Subsequently, a pre-generated key is used to perform encryption processing on a portion of the content of a multimedia file. This processing includes: determining whether or not the content of the multimedia file to be downloaded has a header. If the multimedia file has a header (the result of determining is yes), then a key is used to perform encryption processing on the header of the multimedia file. If the multimedia file has no header (the result of determining is no), then a key is used to encrypt a predetermined length of the content of the multimedia file.

Wherein the predetermined length of the content of the multimedia file may be a predetermined length of the content from the beginning of the multimedia file.

Step S104: downloading the encrypted multimedia file to a designated terminal equipment.

Afterwards, if it is needed to play the multimedia file, the terminal equipment will use a key to decrypt the multimedia file, and play the decrypted multimedia file.

Through the foregoing processing, only a portion of content of the multimedia file needs to be encrypted when the multimedia content of a file type specified in the DRM protocol is downloaded, and only the encrypted portion of the content of the multimedia file needs to be decrypted during playing the multimedia file. In this way, in the circumstance where the security of the content is guaranteed, the downloading speed of the multimedia file is increased and the waiting time for playing the file is decreased.

Figure 2:
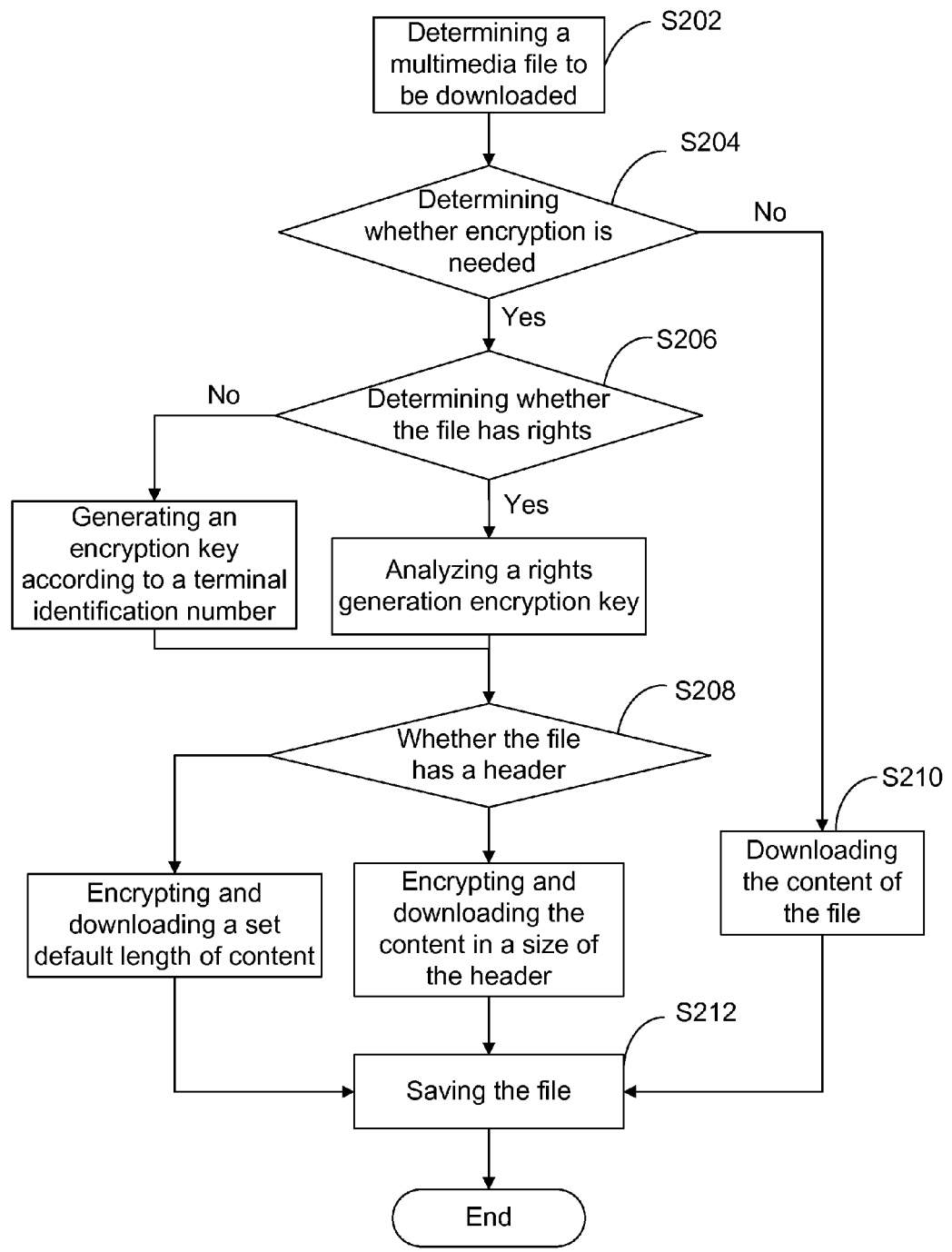
FIG. 2 is a flowchart illustrating a processing solution for downloading a DRM multimedia file in the method for applying digital rights management according to an embodiment of the present disclosure.

Below an embodiment of the present disclosure is described in detail by referring to FIG. 2 and FIG. 3. FIG. 2 is a flowchart illustrating a processing solution for downloading a DRM multimedia file in the method for applying digital rights management according to an embodiment of the present disclosure. As shown in FIG. 2, this processing method includes the following steps.

Steps S202-S204: determining a multimedia file to be downloaded and determining whether or not the file needs to be encrypted, if yes, then executing step S206, otherwise, executing step S210.

Step S206: determining whether or not the file to be downloaded has rights (RO), if yes, then generating an encryption key according to rights; if not, then generating an encryption key according to the terminal identification information of the download terminal, for example, the terminal identification information may be IMEI of the terminal.

Step S208: determining whether or not the file has a header, if yes, then encrypting the header of the multimedia file using the encryption key generated in step S206; if not, then encrypting a set default length of the content of the file according to the preset encryption algorithm, and downloading the file to the terminal equipment after encryption.

Step S210: downloading the content of the file which does not need to be encrypted to the terminal equipment.

S212: saving the file after completion of the downloading.

After the foregoing processing, the multimedia file can be played on the terminal equipment. FIG. 3 is a flowchart illustrating a processing solution for playing a DRM multimedia file in the method for applying digital rights management according to an embodiment of the present disclosure. As shown in FIG. 3, the processing method includes the following steps.

Step S302: determining a multimedia file to be played.

Step S304: determining whether or not the multimedia file contains encrypted content, if yes, then executing step S306, otherwise, executing step S308.

Step S306: decoding the encrypted content using a key.

Step S308: playing the multimedia file, wherein the unencrypted content is played directly without decryption.

Embodiment of the Apparatus

According to an embodiment of the present disclosure, terminal equipment is provided.

Figure 4:
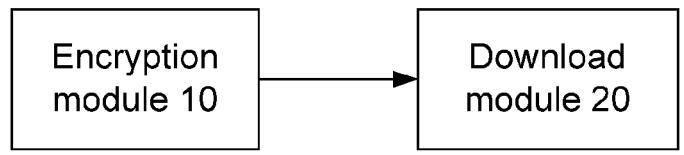
FIG. 4 is a block diagram of a terminal equipment according to an embodiment of the present disclosure.

FIG. 4 is a block diagram of a terminal equipment according to an embodiment of the present disclosure. As shown in FIG. 4, the terminal equipment includes: an encryption module 10 and a download module 20.

The encryption module 10 is configured to use a pre-generated key to perform is encryption processing on a portion of the content of the multimedia file to be downloaded. The download module 20, connected with the encryption module 10, is configured to download the multimedia file encrypted by the encryption module 10 to a designated terminal equipment.

Figure 5:
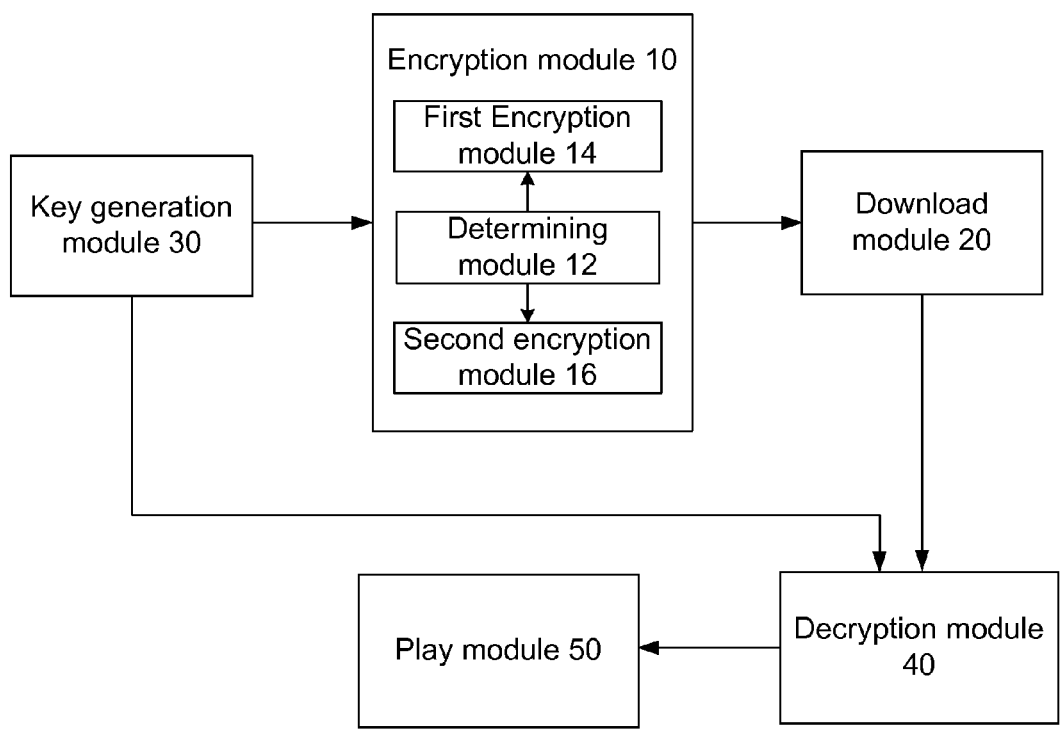
FIG. 5 is a block diagram illustrating a preferred structure of a terminal equipment according to an embodiment of the present disclosure.

FIG. 5 is a block diagram illustrating a preferred structure of a terminal equipment according to an embodiment of the present disclosure. As shown in FIG. 5, on the basis of the structure as shown in FIG. 4, the terminal equipment includes: a key generation module 30, which is connected with the encryption module 10, and configured to generate a key according to rights of the multimedia file or identification information of the terminal equipment; a decryption module 40, which is connected with the download module 20 and the key generation module 30 respectively, and configured to use the key generated by the key generation module 30 to decrypt the multimedia file downloaded by the download module 20; a play module 50, which is connected with the decryption module 40, and configured to play the multimedia file decrypted by the decryption module 40.

By continuing to refer to FIG. 5, the encryption module 10 includes: a determining module 12, which is configured to determine whether or not the multimedia file has a header; a first encryption module 14, which is configured to encrypt the header of the multimedia file using a key when the result of determining of the determining module 12 is yes; and a second encryption module 16, which is configured to encrypt a predetermined length of the content of the multimedia file using a key when the result of determining of the determine module is no. Wherein the second encryption module encrypts a predetermined length of the content from the beginning of the multimedia file using a key.

Figure 3:
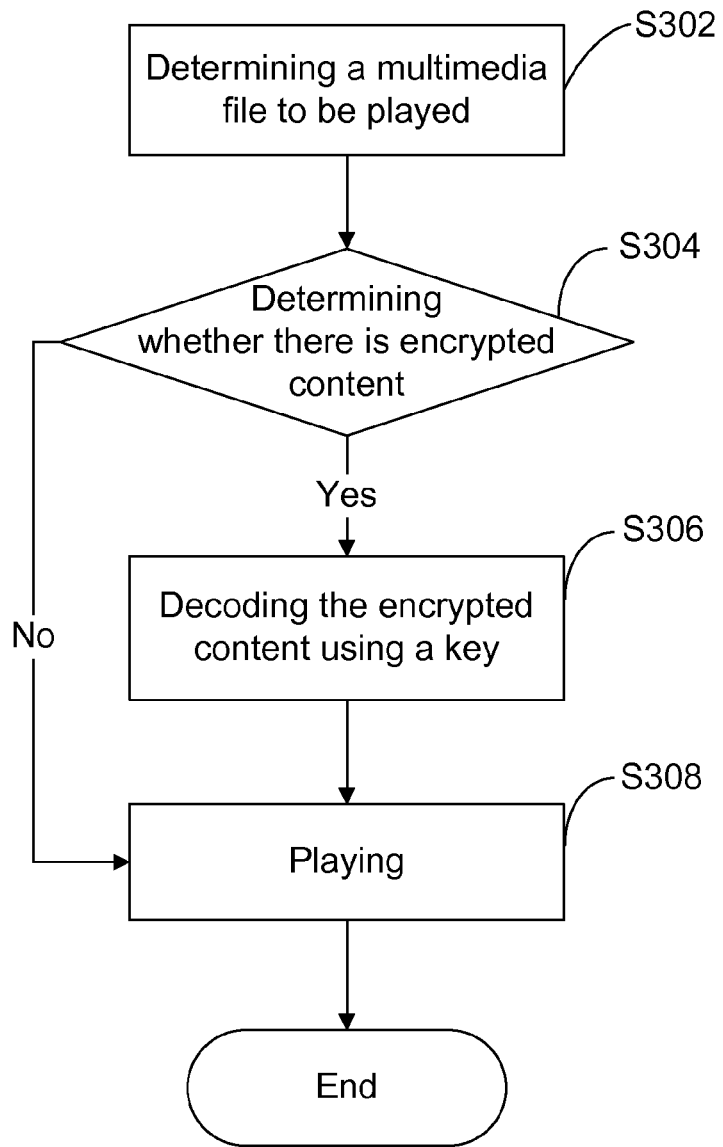
FIG. 3 is a flowchart illustrating a processing solution for playing a DRM multimedia file in the method for applying digital rights management according to an embodiment of the present disclosure.

In the application process, the processing flow of the terminal equipment according to the embodiment of the present disclosure may refer to FIG. 1~FIG. 3, and will not be elaborated here.

To summarize, according to the foregoing technical solution of the present disclosure, only a portion of the multimedia content needs to be encrypted when the multimedia content of a file type specified in the DRM protocol is downloaded, and only the encrypted portion of the content needs to be decrypted during playing the multimedia content. In this way, in the circumstance where the security of the content is guaranteed, the downloading speed of the multimedia file is increased, and the waiting time for playing the file is decreased.

The foregoing descriptions are only embodiments of the present disclosure and are not intended to limit the present disclosure. For those skilled in the art, the present disclosure may have various changes and modifications. All modifications, equivalent replacements and improvements made without departing from the spirit and principle of the present disclosure shall be within the protection scope of the present disclosure.

The invention claimed is:

1. A method for applying digital rights management, comprising:
   performing encryption processing on a portion of content of a multimedia file using a pre-generated key when downloading the multimedia file; and
   downloading the encrypted multimedia file to a designated terminal equipment,
   wherein performing encryption processing on a portion of content of the multimedia file using the key comprises:
   determining whether or not the multimedia file has a header;
   performing encryption processing on a header of the multimedia file using the key when the multimedia file has a header; and
   performing encryption processing on a predetermined length of content of the multimedia file using the key when the multimedia file has no header.

2. The method according to claim 1, wherein pre-generating a key comprises:
   determining whether or not the multimedia file has rights;
   generating a key according to rights of the multimedia file when the multimedia file has rights; and
   generating a key according to identification information of the terminal equipment when the multimedia file has no rights.

3. The method according to claim 1, wherein the predetermined length of the content of the multimedia file comprises:
   a predetermined length of content from a beginning of the multimedia file.

4. The method according to claim 1, further comprising:
   decrypting, by the terminal equipment, the multimedia file using the key and playing the decrypted multimedia file.

5. A terminal equipment, comprising a processor for implementing:
   an encryption module disposed to use a pre-generated key to perform encryption processing on a portion of content of a multimedia file to be downloaded; and
   a download module disposed to download the multimedia file encrypted by the encryption module to a designated terminal equipment,
   wherein the encryption module comprises:
   a determining module disposed to determine whether or not the multimedia file has a header;
   a first encryption module disposed to encrypt a header of the multimedia file using the key when the multimedia file is determined to have a header; and
   a second encryption module disposed to encrypt a predetermined length of content of the multimedia file using the key when the multimedia file is determined to have no header.

6. The terminal equipment according to claim 5, further comprising:
   a key generation module disposed to generate the key according to rights of the multimedia file or identification information of the terminal equipment.

7. The terminal equipment according to claim 6, further comprising:
   a decryption module disposed to use the key to decrypt the multimedia file downloaded by the download module; and
   a play module disposed to play the multimedia file decrypted by the decryption module.

8. The terminal equipment according to claim 5, wherein the second encryption module is disposed to encrypt a predetermined length of the content from a beginning of the multimedia file using the key.

* * * * *